United States Patent
Horio et al.

(10) Patent No.: US 7,639,703 B2
(45) Date of Patent: Dec. 29, 2009

(54) DATA OUTPUT METHOD USING A JITTER BUFFER, DATA OUTPUT APPARATUS USING A JITTER BUFFER, COMMUNICATION SYSTEM USING A JITTER BUFFER AND COMPUTER PROGRAM PRODUCT

(75) Inventors: Kenichi Horio, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 11/193,555

(22) Filed: Jul. 29, 2005

(65) Prior Publication Data

US 2006/0193254 A1 Aug. 31, 2006

(30) Foreign Application Priority Data

Feb. 25, 2005 (JP) ............................. 2005-051991

(51) Int. Cl.
*H04L 12/56* (2006.01)
(52) U.S. Cl. .................................................. 370/412
(58) Field of Classification Search ................. 370/229, 370/230, 235, 412, 413, 415, 417, 428
See application file for complete search history.

(56) References Cited

U.S. PATENT DOCUMENTS

| 7,035,215 | B1 * | 4/2006 | Engdahl ...................... 370/235 |
| 7,149,186 | B1 * | 12/2006 | Hey ............................ 370/232 |
| 2004/0013114 | A1 * | 1/2004 | Su et al. ..................... 370/389 |
| 2005/0094563 | A1 | 5/2005 | Takeshita et al. |
| 2006/0233200 | A1 * | 10/2006 | Fifield et al. ................ 370/473 |

FOREIGN PATENT DOCUMENTS

| JP | 2003-087317 | 3/2003 |
| JP | 2005-136742 | 5/2005 |

* cited by examiner

*Primary Examiner*—Ricky Ngo
*Assistant Examiner*—Wei-Po Kao
(74) *Attorney, Agent, or Firm*—Katten Muchin Rosenman LLP (57) ABSTRACT

A data output apparatus judges whether or not sound data that has not yet been outputted has been accumulated. When a judgment is made that there is no accumulation of sound data that has not yet been outputted, the data output apparatus reads already-outputted sound data that was outputted previously and saved, and reproduces (outputs) sound based on the read sound data. Since it is possible to reduce occurrence of abnormality such as sound interruption in the data output apparatus such as an IP telephony terminal apparatus, a lowering of communication quality such as voice quality can be prevented.

13 Claims, 9 Drawing Sheets

DATA OUTPUT METHOD USING A JITTER BUFFER, DATA OUTPUT APPARATUS USING A JITTER BUFFER, COMMUNICATION SYSTEM USING A JITTER BUFFER AND COMPUTER PROGRAM PRODUCT

CROSS-REFERENCE TO RELATED APPLICATION

This non-provisional application claims priority under 35 U.S.C. §119 (a) on Patent Application No. 2005-51991 filed in Japan on Feb. 25, 2005, the entire contents of which are hereby incorporated by reference.

BACKGROUND OF THE INVENTION

1. Field of the Invention

The present invention relates to a data output method for temporarily accumulating received data and performing output based on the accumulated data, a data output apparatus adopting such a data output method, and a communication system including such a data output apparatus, and further relates to a computer program product for realizing the above-mentioned data output apparatus. In particular, the present invention relates to a data output method, a data output apparatus, a communication system and a computer program product suitable for real-time communication such as VoIP, streaming distribution and the like.

2. Description of Related Art

In recent years, there is an increasing use of applications that enable real-time communication such as VoIP (Voice over Internet Protocol), VoPN (Voice over Packet Network) and streaming distribution in which voice and/or video data is transmitted and received between apparatuses through a communication network such as an IP network. In particular, IP telephony that is one example of such applications is spread rapidly. In the IP telephony system, by transmitting and receiving voice data in the form of packets through an IP network, communication is realized between an apparatus at the transmitting end of packets and an apparatus at the receiving end of packets. However, in the communication through the IP network, since the arrival delay time required for transferring packets from the apparatus at the transmitting end to the apparatus at the receiving end varies depending on each packet, there is a problem of jitter. The jitter in the arrival delay time is a serious problem for IP telephony that is required to perform real-time and continuous communication. In order to solve such a problem, in the IP telephony system, the apparatus at the receiving end of packets is provided with a buffer called a "jitter buffer". The apparatus (IP phone set) at the receiving end having the jitter buffer realizes stable voice outputted by temporarily accumulating received packets in the jitter buffer and absorbing the jitter in the arrival delay time before outputting the packets as voice.

When outputting voice using the jitter buffer in such a manner, the larger the accumulation capacity of the jitter buffer for accumulating packets, the greater the ability of absorbing the jitter in the arrival delay time, but there is a problem that the delay from the arrival of a packet to the output of the packet becomes larger. In order to solve such a problem, Japanese Patent Application Laid-Open No. 2003-87317 discloses a method in which an arrival delay time is calculated by measuring the arrival time intervals of packets, and a discard threshold value, namely the accumulation capacity of the jitter buffer is determined based on the jitter in the calculated arrival delay time.

However, in the method disclosed in the Japanese Patent Application Laid-Open No. 2003-87317, since the accumulation capacity of the jitter buffer is determined based on the jitter in the arrival delay time, this method does not take into account reproduction jitter that occurs when performing reproduction based on the packets accumulated in the jitter buffer.

Therefore, for example, when the data amount transmitted from the transmitting end in a predetermined period is larger than the data amount reproduced at the receiving end, data reproduction at the receiving end cannot catch up with the transmission of data and the buffer is always in an overflow state, and consequently reproduction delay corresponding to the buffer capacity occurs constantly, namely a constant delay occurs.

In order to solve such a problem, the applicant of the present application in Japan has applied an invention of monitoring the constant delay and optimizing the accumulation capacity of the jitter buffer according to the state of the constant delay (Japanese Patent Application Laid-Open No. 2005-136742). In this invention, it is possible to set the accumulation capacity of the jitter buffer to an appropriate value by taking into account the jitter in the arrival delay time and the jitter during reproduction. However, the accumulation capacity of the jitter buffer has not been optimized in the period from the start of communication to the determination of the accumulation capacity of the jitter buffer. Hence, similarly to prior arts, there arises a problem that sound interruption occurs and communication quality such as voice quality is lowered. For example, when the accumulation capacity of the jitter buffer is set relatively small and the arrival delay time varies largely, the packet data accumulated in the jitter buffer runs out, and consequently sound interruption occurs.

BRIEF SUMMARY OF THE INVENTION

The present invention has been made with the aim of solving the above problems, and it is an object of the present invention to provide a data output method capable of preventing a lowering of communication quality even when there is no accumulation of data that has not yet been outputted in the jitter buffer, a data output apparatus adopting such a data output method, a communication system including such a data output apparatus, and a computer program product for realizing the data output apparatus.

More precisely, when there is no accumulation of data that has not yet been outputted in the jitter buffer, the present invention re-outputs data that was outputted previously and increases the accumulation capacity of the jitter buffer according to the amount of the data re-outputted, thereby preventing a lowering of communication quality which may occur before the accumulation capacity of the jitter buffer has been optimized.

A data output method of the present invention for accumulating received data in an accumulating unit and performing output based on the data accumulated in the accumulating unit, is characterized by comprising the steps of saving already-outputted data; judging, when performing output based on data, whether or not data that has not yet been outputted has been accumulated in the accumulating unit; and performing output based on the saved already-outputted data when a judgment is made that there is no accumulation of data that has not yet been outputted.

Moreover, a data output method according to the present invention is based on the above-described data output method, and characterized in that an upper limit value is set on an accumulated amount of data in the accumulating unit, and the method further comprises the steps of accumulating already-outputted data in the accumulating unit when a judgment is made that there is no accumulation of data that has not yet been outputted; and increasing a set value of the upper limit value according to an amount of already-outputted data accumulated in the accumulating unit.

A data output apparatus of the present invention includes an accumulating unit for accumulating received data, for performing output based on the data accumulated in the accumulating unit, and is characterized by comprising: a data saving unit for saving already-outputted data; and a judging unit for, when performing output based on data, judging whether or not data that has not yet been outputted has been accumulated in the accumulating unit, wherein when the judging unit judges that there is no accumulation of data that has not yet been outputted, output is performed based on the already-outputted data saved in the data saving unit.

Moreover, a data output apparatus according to the present invention is based on the above-described data output apparatus, and is characterized in that an upper limit value of an accumulated amount of data is set for the accumulating unit, and a set value of the upper limit value of accumulated amount of data in the accumulating unit is increased, when output is performed base on the already-outputted data.

Further, a data output apparatus according to the present invention is based on the above-described data output apparatus, and is characterized in that an upper limit value of an accumulated amount of data is set for the accumulating unit, the accumulating unit accumulates the already-outputted data saved in the data saving unit, when the judging unit judges that there is no accumulation of data that has not yet been outputted, and a set value of the upper limit value of accumulated amount of data in the accumulating unit is increased according to an amount of already-outputted data accumulated in the accumulating unit.

Further, a data output apparatus according to the present invention is based on the above-described data output apparatus, and is characterized in that, an upper limit value is set on the number of times of output based on the already-outputted data, and the data output apparatus further comprises: a counting unit for counting the number of times of output based on the already-outputted data; and a restricting unit for restricting output based on the already-outputted data, based on the number of times of output counted by the counting unit and the upper limit value of the number of times of output.

More further, a data output apparatus according to the present invention is based on the above-described data output apparatus, and is characterized in that as an upper limit value of an accumulated amount of data in the accumulating unit, a value before starting output based on the already-outputted data is saved as a saved value, and when the restricting unit restricts output based on the already-outputted data, the saved value is set as the upper limit value of the accumulated amount of data in the accumulating unit.

A communication system according to the present invention is characterized by including a transmitting apparatus for transmitting data; and any one of the above-described data output apparatuses.

Moreover, a communication system according to the present invention is based on the above-described communication system, and is characterized in that the data is sound data and output of said data output apparatus is reproduced sound base on the sound data.

Moreover, a communication system according to the present invention is based on the above-described communication system, and is characterized by further including a receiving apparatus for receiving data, wherein the data output apparatus outputs and transmits data received from the transmitting apparatus to the receiving apparatus.

Moreover, a communication system according to the present invention is based on the above-described communication system, and is characterized in that the data is sound data, and the receiving apparatus reproduces sound base on the sound data received from the data output apparatus.

A computer program product of the present invention for controlling output based on data accumulated in an accumulating unit for accumulating data received from outside, is characterized by comprises a computer readable storage medium having computer readable program code means embodied in the medium, the computer readable program code means comprising computer instruction means for: saving already-outputted data; judging, when performing output based on data, whether or not data that has not yet been outputted has been accumulated in the accumulating unit; and performing output based on the saved already-outputted data when a judgment is made that there is no accumulation of data that has not yet been outputted.

Moreover, a computer program product according to the present invention is based on the above-described computer program product, and characterized in that the computer instruction means for performing output further comprises computer instruction means for: accumulating the saved already-outputted data in the accumulating unit; and increasing a set value of an upper limit value in the accumulating unit, according to the amount of the accumulated already-outputted data.

A data output method, data output apparatus, communication system and computer program product according to the present invention as described above are applied to apparatuses such as, for example, an apparatus at the receiving end and a relay apparatus involved in packet communication such as an IP telephony system. More specifically, received data, particularly sound data is accumulated in the accumulating unit such as a jitter buffer for accumulating received data, and already-outputted data based on which output, such as reproduction of sound based on the accumulated sound data and transmission as packets, has been performed is saved. Further, for example, when there is no accumulation of data that has not yet been outputted in the jitter buffer due to large jitter in the arrival delay time, the accumulation and output of data based on the already-outputted data outputted previously are performed again.

According to the present invention, even when new data is not received due to jitter in the arrival delay time, it is possible to reduce occurrence of abnormality, such as sound interruption which is caused when data to be outputted is not accumulated in the accumulating unit, thereby preventing a lowering of communication quality such as voice quality. Moreover, since the present invention can reduce occurrence of abnormality irrespective of the accumulation capacity of the accumulating unit for accumulating data, when it is applied to an apparatus for automatically optimizing the accumulation capacity of the accumulating unit, it is possible to prevent a lowering of communication quality even before the accumulation capacity is optimized. In particular, when the present invention is applied to communication required to maintain continuity, such as an IP telephony system, it is possible to realize stable voice output.

In addition, according to the present invention, since an upper limit value is set on the accumulated amount of data and the set upper limit value of the accumulated amount is increased when performing output based on already-outputted data, it is possible to prevent sound interruption due to jitter in the subsequent arrival delay time.

Further, the present invention adds the configuration of setting an upper limit value on the number of times the same data can be outputted. In this case, it is possible to reduce the feeling of incongruity during communication which is caused by reproducing the same sound many times.

Besides, the present invention adds the configuration of returning the upper limit value of the accumulated amount of data to a preset initial value when the number of times the same data has been outputted exceeds the upper limit value and the packet is discarded. In this case, even when a state incapable of receiving data continues over a long time, it is possible to prevent the upper limit value of the accumulated amount of data from becoming too high. It is therefore possible to prevent an increase of voice delay due to too high upper limit value of the accumulated amount.

The above and further objects and features of the invention will more fully be apparent from the following detailed description with accompanying drawings.

DETAILED DESCRIPTION OF THE PRESENT INVENTION

The following description will explain in detail the present invention, based on the drawings illustrating preferred embodiments thereof.

Embodiment 1

Figure 1:
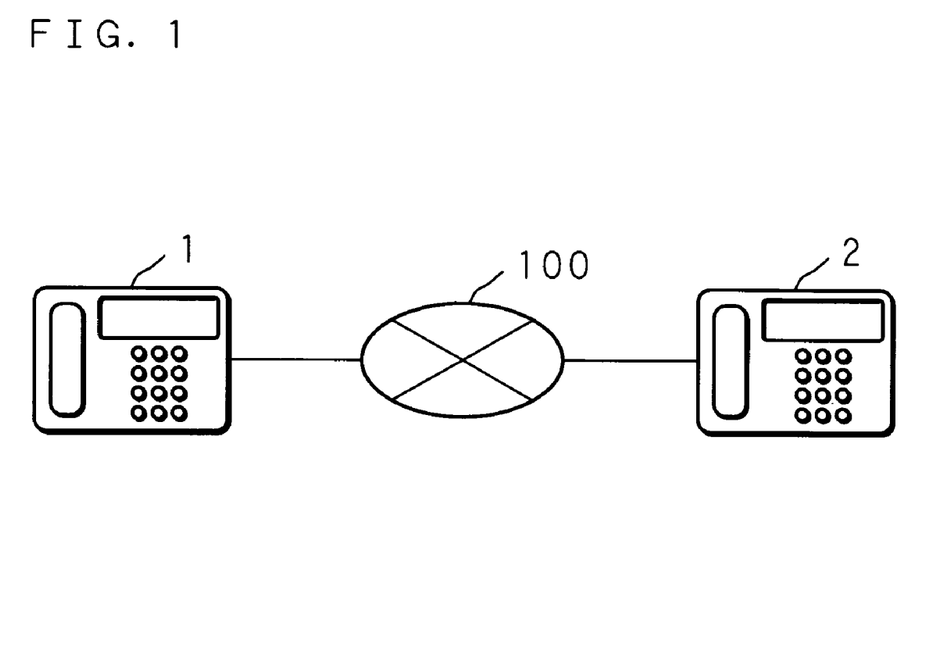
FIG. 1 is a schematic view showing conceptually an example of the configuration of a communication system of Embodiment 1 of the present invention.

FIG. 1 is a schematic view showing conceptually an example of the configuration of a communication system of Embodiment 1 of the present invention.

In FIG. 1, reference numeral 1 represents a data output apparatus of the present invention, and a computer for communication such as an IP telephony terminal apparatus is used. The data output apparatus 1 is connected to a communication network 100 such as a VoIP network composed of a relay apparatus such as an Internet router and communication lines, and performs packet communication with a transmitting apparatus 2 such as an IP telephony terminal apparatus. The transmitting apparatus 2 generates packets including sound data for outputting inputted sound, and transmits the generated packets to the data output apparatus 1 through the communication network 100. The data output apparatus 1 outputs sound based on the sound data included in the packets received from the transmitting apparatus 2. The packets including sound data are based on standards such as RTP (Real-time Transport Protocol) that is a protocol for use in VoIP communication. Note that although the data output apparatus 1 and the transmitting apparatus 2 are explained as different apparatuses for the sake of explanation, the configurations of these two apparatuses are substantially the same, and they are not limited to one-way communication from the transmitting apparatus 2 to the data output apparatus 1 and are able to perform interactive communication.

Figure 2:
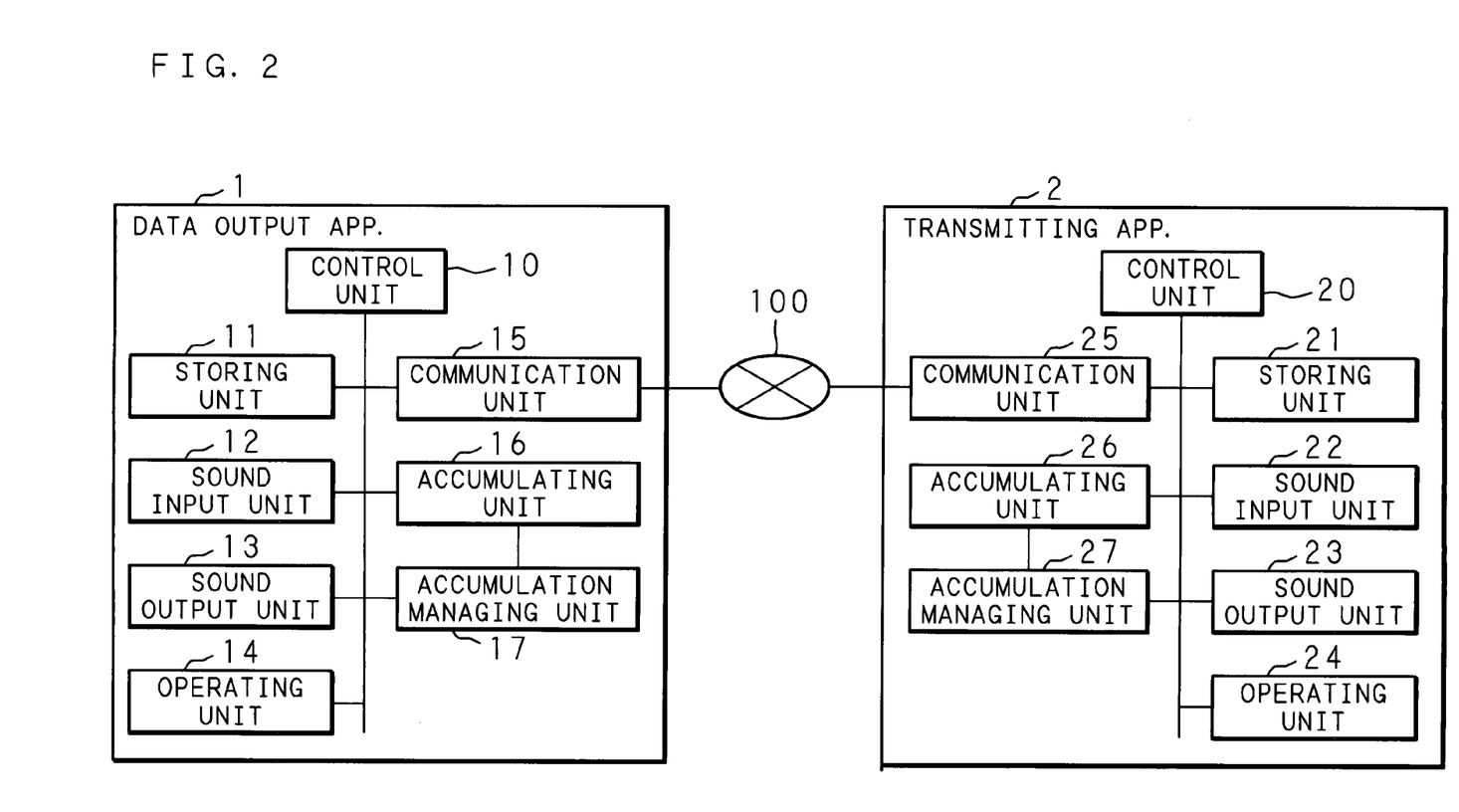
FIG. 2 is a block diagram showing an example of the internal configurations of various apparatuses used in the communication system of Embodiment 1 of the present invention.

FIG. 2 is a block diagram showing an example of the internal configurations of various apparatuses used in the communication system of Embodiment 1 of the present invention.

The data output apparatus 1 comprises a control unit 10 for controlling the whole apparatus. Connected through a bus to the control unit 10 are various circuits including a storing unit 11 composed of volatile and non-volatile memory for storing various types of information such as computer programs and data, a sound input unit 12 such as a microphone for receiving input of sound, a sound output unit 13 such as a speaker for outputting sound, an operating unit 14 including various push buttons, a communication unit 15 to be connected to the communication network 100, an accumulating unit 16 for use as a communication buffer, and an accumulation managing unit 17 for controlling the accumulation of data in the accumulating unit 16.

The data output apparatus 1, under the control of the control unit 10, converts sound received as an input of analog data from the sound input unit 12 into digital data, divides the sound data in the form of digital data into a predetermined data length, and transmits the data as packets from the communication unit 15 to the communication network 100. Moreover, the data output apparatus 1, under the control of the control unit 10, receives packets including sound data by the communication unit 15 from the communication network 100, and temporarily accumulates the sound data included in the received packets in the accumulating unit 16. The sound data accumulated in the accumulating unit 16 is converted into analog data and outputted as sound from the sound output unit 13 at a predetermined time interval set as an output interval.

The transmitting apparatus 2 comprises various circuits including a control unit 20, a storing unit 21, a sound input unit 22, a sound output unit 23, an operating unit 24, a communication unit 25, an accumulating unit 26, and an accumulation managing unit 27, and is basically configured in the same manner as the above-described data output apparatus 1.

Figure 3:
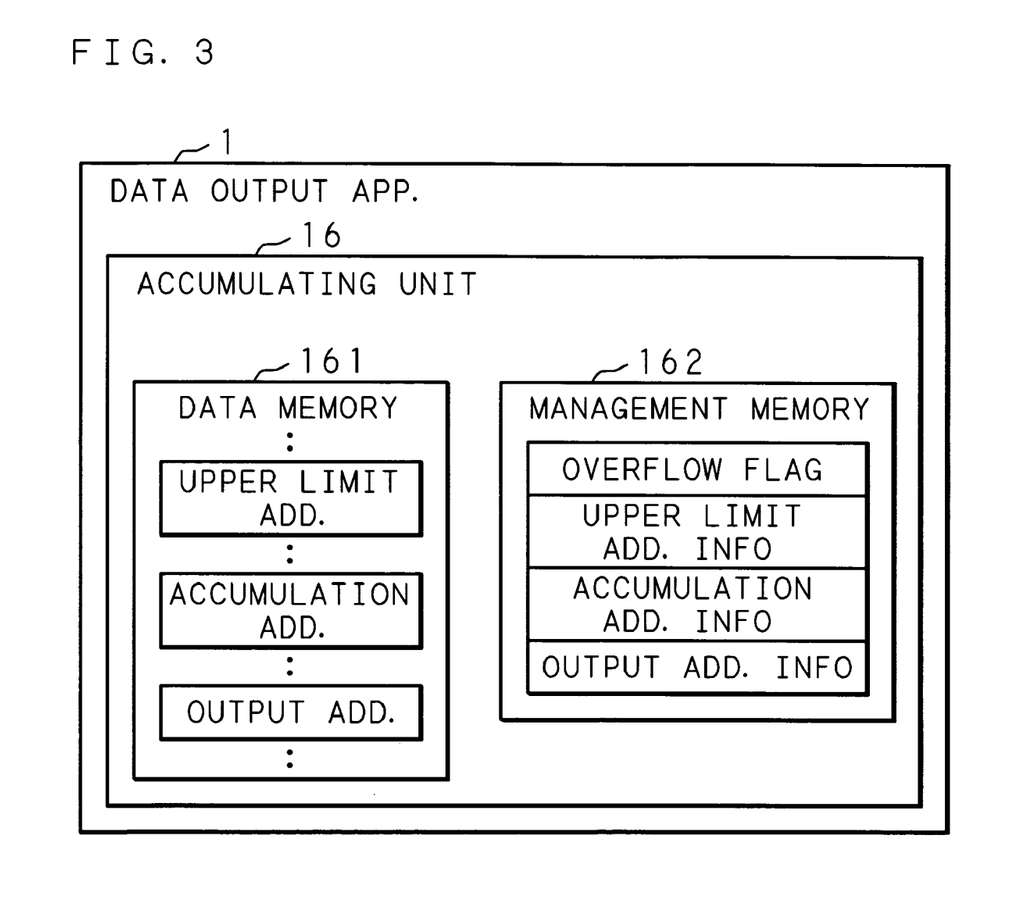
FIG. 3 is a block diagram showing an example of the functional configuration of an accumulating unit of a data output apparatus of Embodiment 1 of the present invention.

FIG. 3 is a block diagram showing an example of the functional configuration of the accumulating unit 16 of the data output apparatus 1 of Embodiment 1 of the present invention. The accumulating unit 16 has a data memory 161 for accumulating sound data included in the received packets, and a management memory 162 for use in managing the sound data accumulated in the data memory 161.

The management memory 162 stores output address information indicating an output address showing a location up to which output of sound data accumulated in the data memory 161 to the sound output unit 13 has been completed; accumulation address information indicating an accumulation address showing a location up to which the sound data has been accumulated; and an upper limit address information indicating an upper limit address showing a location up to which data can be accumulated. In addition, an overflow flag indicating whether or not the accumulated amount of data accumulated in the data memory 161 has reached an upper limit address is set in the management memory 162. When the overflow flag is "0", it means that the accumulated amount of data has not reached the upper limit address, whereas when the overflow flag is "1", it means that the accumulated amount of data has reached the upper limit address.

The sound data included in the packets received by the communication unit 15 is started to be accumulated from the location indicated by the accumulation address information in the data memory 161, and the accumulation address information is updated according to the amount of accumulated data. However, when data is accumulated and the location indicated by the accumulation address information exceeds the location indicated by the upper limit address information, the data is accumulated in the data memory 161 up to the location indicated by the upper limit address information, but the excess of data is discarded and the overflow flag is set to "1".

When output to the sound output unit 13 has been completed, the output address information is updated to an address indicating the location at which output has been completed, and the upper limit address information is also updated according to the updated output address information. In other words, in the data memory 161, the range from the location indicated by the output address information to the location indicated by the upper limit address information is constant, and the amount of data accumulated based on the addresses within this range will be the upper limit of the accumulated amount of data in the data memory 161, that is, the upper limit of the accumulated amount of data in the data output apparatus 1.

Note that when the location indicated by the upper limit address information exceeds the end of the data memory 161, the location indicated by the upper limit address information becomes the start address of the data memory 161. The same thing can also be said for the accumulation address information and the output address information. In short, the data memory 161 is a virtual ring-structured memory.

Figure 4:
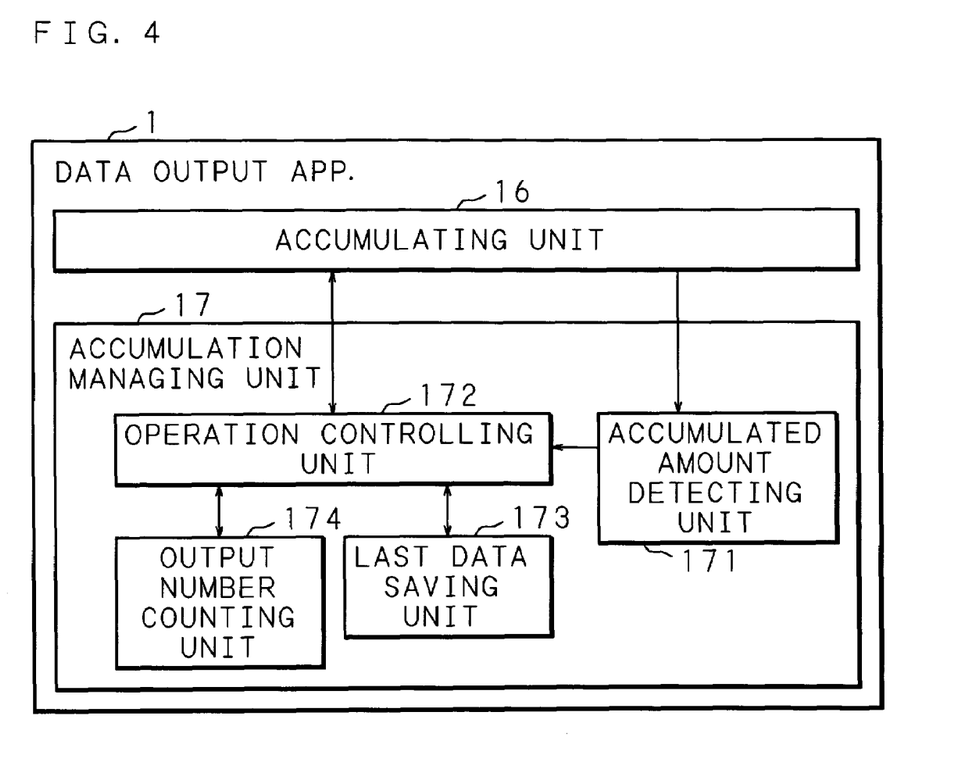
FIG. 4 is a block diagram showing an example of the functional configuration of an accumulation managing unit of the data output apparatus of Embodiment 1 of the present invention.

FIG. 4 is a block diagram showing an example of the functional configuration of the accumulation managing unit 17 of the data output apparatus 1 of Embodiment 1 of the present invention.

The accumulation managing unit 17 comprises modules composed of hardware and software, such as an accumulated amount detecting unit 171 for detecting the amount of data that has not yet been outputted and has been accumulated in the accumulating unit 16 based on the output address information and the accumulation address information; an operation controlling unit 172 for controlling the operation relating to the accumulation in the accumulating unit 16 based on the data amount detected by the accumulated amount detecting unit 171; a last data saving unit 173 for saving sound data outputted from the accumulating unit 16 to the sound output unit 13 based on the control performed by the operation controlling unit 172; and an output number counting unit 174 for counting the number of times the sound data saved in the last data saving unit 173 has been outputted, based on the control performed by the operation controlling unit 172.

As parameters necessary for control, the operation controlling unit 172 stores various data, such as an initial accumulation value indicating a base data location for starting output of sound data accumulated in the accumulating unit 16, an accumulation upper limit value indicating an upper limit value of sound data to be accumulated in the accumulating unit 16, an accumulation upper limit saved value for temporarily saving the value of the accumulation upper limit value, and an output number upper limit value showing an upper limit value of the number of times the sound data saved in the last data saving unit 173 can be re-outputted.

The basic operation of the above-mentioned accumulation managing unit 17 is as follows. When the data output apparatus 1 starts communication, the sound data included in packets received by the communication unit 15 is accumulated in the accumulating unit 16. Then, the accumulated amount detecting unit 171 detects the accumulated data amount, and outputs information showing the detected data amount to the operation controlling unit 172. When the operation controlling unit 172 judges, based on the information received from the accumulated amount detecting unit 171, that the data amount has reached the initial accumulation value, it starts outputting the sound data accumulated in the accumulating unit 16. Moreover, the operation controlling unit 172 sets the upper limit address information of the data memory 161 of the accumulating unit 16, based on the accumulation upper limit value.

Further, the operation controlling unit 172 reads the data outputted from the accumulating unit 16 and outputs the read data as sound from the sound output unit 13, and then saves the already-outputted data in the last data saving unit 173. In the last data saving unit 173, one or a plurality of pieces of already-outputted data is saved. The data saved in the last data saving unit 173 is updated every time the operation controlling unit 172 reads already-outputted data. Note that since the already-outputted data is accumulated in the range from the location indicated by the output address information to the location indicated by the accumulation address information in the data memory 161, it is possible to use the this range of accumulation area as a saving area for saving the last data. In this case, in the last data saving unit 173, the address of the location at which the last data is saved in the data memory 161 is stored.

When there is a shortage of data accumulated in the accumulating unit 16 and continuous voice reproduction becomes difficult, then the operation controlling unit 172 reads the data saved in the last data saving unit 173 and accumulates it in the accumulating unit 16. Thus, the data accumulated in the accumulating unit 16 is outputted to the sound output unit 13 and outputted as sound from the sound output unit 13. Note that the number of times the data saved in the last data saving unit 173 has been read is counted by the output number counting unit 174 as the re-output number indicating the number of times the saved data has been re-outputted.

Figure 5:
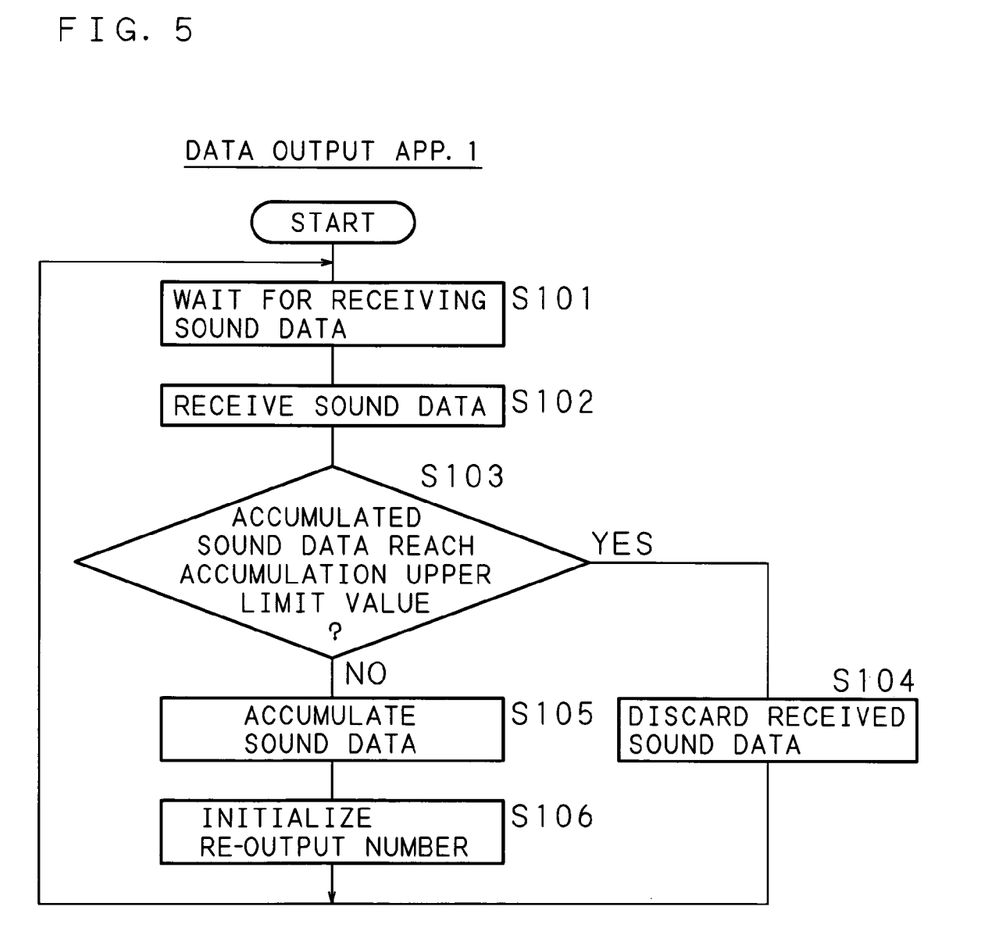
FIG. 5 is a flowchart showing the procedure of an accumulation process performed by the data output apparatus constituting the communication system of Embodiment 1 of the present invention.

Next, the following description will explain the operation of the data output apparatus 1 constituting a communication system of Embodiment 1 of the present invention. FIG. 5 is a flowchart showing the procedure of an accumulation process performed by the data output apparatus 1 constituting the communication system of Embodiment 1 of the present invention. According to a computer program stored in the storing unit 11, the control unit 10 executes the process.

The control unit 10 of the data output apparatus 1 waits for receiving sound data in the form of a packet that is transmitted from the transmitting apparatus 2 through the communication network 100 (S101), and receives a packet including sound data by the communication unit 15 (S102). Then, the control unit 10 judges whether or not the accumulated amount of sound data accumulated in the accumulating unit 16 has reached the accumulation upper limit value by the accumulation managing unit 17 (S103). When a judgment is made that the accumulated amount has reached the accumulation upper limit value (S103: YES), the control unit 10 discards the received sound data in the form of a packet (S104), and returns the process to step S101 and repeats the above-described process to receive the next packet.

In step S103, when a judgment is made that the accumulated amount of sound data accumulated in the accumulating unit 16 has not reached the accumulation upper limit value (S103: NO), the control unit 10 accumulates the sound data included in the received packet in the accumulating unit 16 (S105), and initializes the re-output number counted by the output number counting unit 174 in the accumulation managing unit 17 (S106). Thereafter, the control unit 10 returns the process to step S101, and repeats the above-described process to receive the next packet. Thus, the control unit 10 of the data output apparatus 1 repeats the data accumulation process while the communication with the transmitting apparatus 2 continues.

Figure 6:
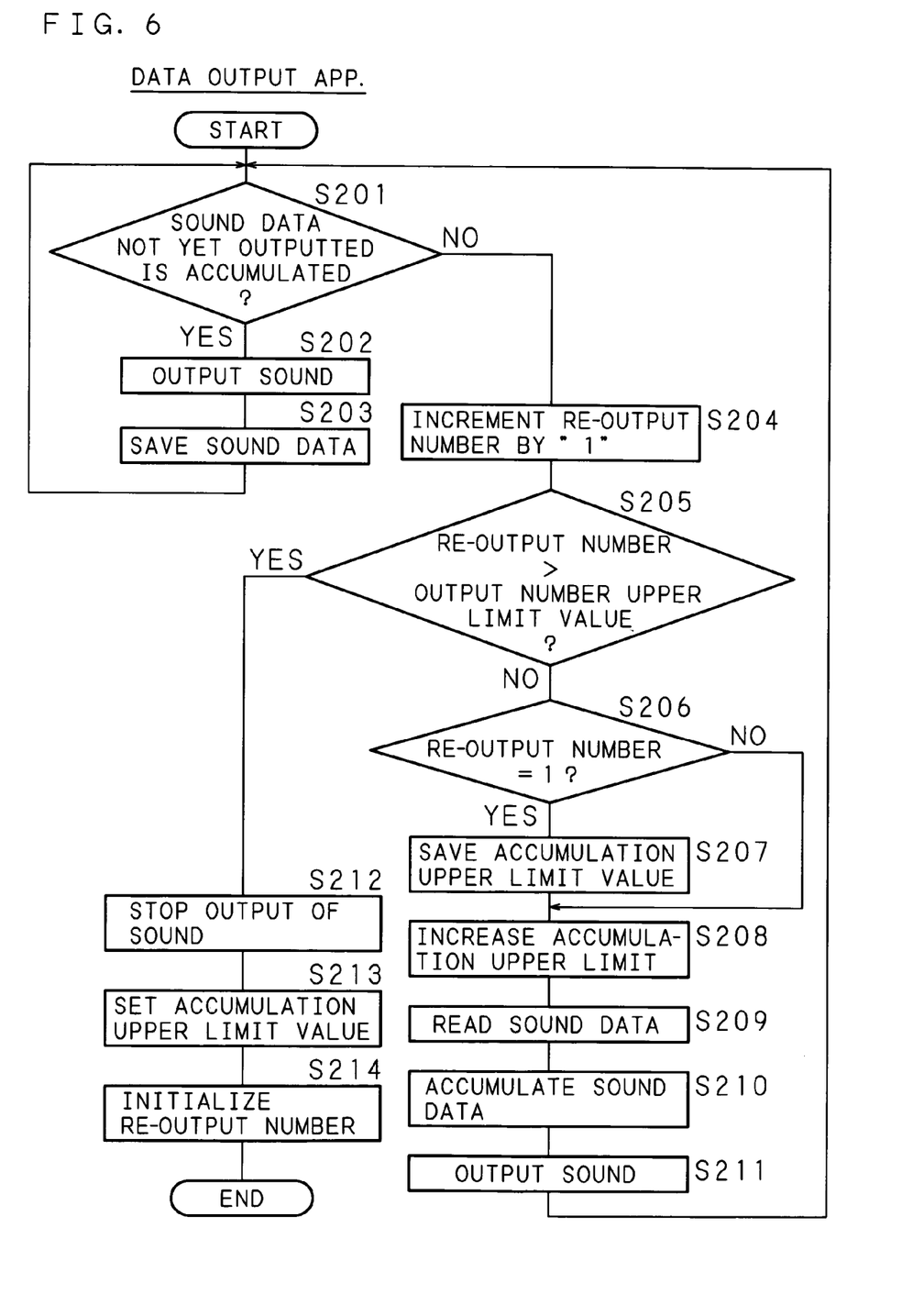
FIG. 6 is a flowchart showing the procedure of an output process performed by the data output apparatus constituting the communication system of Embodiment 1 of the present invention.

FIG. 6 is a flowchart showing the procedure of an output process performed by the data output apparatus 1 constituting the communication system of Embodiment 1 of the present invention. According to the computer program stored in the storing unit 11, the control unit 10 executes the process.

After starting communication or after stopping sound reproduction based on sound data, when the accumulated amount of sound data accumulated in the accumulating unit 16 reaches the initial accumulation value, the control unit 10 of the data output apparatus 1 starts the output process. At a predetermined time interval set as an output interval, the control unit 10 judges whether or not sound data that has not yet been outputted has been accumulated in the accumulating unit 16 (S201). When a judgment is made that there is an accumulation of sound data (S201: YES), the control unit 10 outputs the accumulated sound data to the sound output unit 13 in the order in which the sound data has been accumulated and causes the sound output unit 13 to reproduce (output) sound based on the sound data (S202). Moreover, the control unit 10 causes the accumulation managing unit 17 to read the already-outputted sound data from the accumulating unit 16 and saves it in the last data saving unit 173 (S203), and returns the process to step S201 to repeat the above-described process.

In step S201, when a judgment is made that there is no accumulation of sound data that has not yet been outputted in the accumulating unit 16 (S201: NO), the control unit 10 increments re-output number counted by the accumulation managing unit 17 by "1" (S204), and then judges whether or not the re-output number incremented by "1" exceeds the set output number upper limit value (S205).

In step S205, when a judgment is made that the re-output number does not exceed the output number upper limit value (S205: NO), the control unit 10 judges whether or not the re-output number is "1", that is, whether or not it is the first re-output (S206).

In step S206, when a judgment is made that the re-output number is "1" (S206: YES), the control unit 10 saves the accumulation upper limit value set at this time as an accumulation upper limit saved value in the accumulation managing unit 17 (S207), and increases the accumulation upper limit value set as an upper limit address of the accumulated amount in the accumulating unit 16 by only a predetermined value (S208).

In step S206, when a judgment is made that the re-output number is not "1" (S206: NO), the control unit 10 proceeds the process to step S208 without performing the process of saving the accumulation upper limit value of step S207. In step S208, the control unit 10 increases the accumulation upper limit value set as an upper limit address of the accumulated amount in the accumulating unit 16 by only a predetermined value (S208). In step S208, by increasing the accumulation upper limit value irrespective of the re-output number, the possibility that the data amount accumulated in the accumulating unit 16 in the subsequent communication may exceed the accumulation upper limit value becomes lower. Consequently, since the situation where the received packet is discarded is reduced, it is possible reduce the possibility that there is no accumulation of sound data that has not yet been outputted in the accumulating unit 16.

Then, the control unit 10 reads the sound data, namely already-outputted sound data outputted previously, saved in the last data saving unit 173 in the accumulation managing unit 17 (S209), and stores the read sound data in the data memory 161 of the accumulating unit 16 (S210). Next, by outputting the sound data accumulated in the data memory 161 to the sound output unit 13, the control unit 10 causes the sound output unit 13 to reproduce (output) sound based on the sound data (S211). In other words, the reproduction of sound based on the sound data outputted last, that is, the already-outputted sound data saved in the accumulation managing unit 17, is repeated. Note that it is not necessarily to reproduce sound based only on one piece of already-outputted sound data that was outputted last. It may be possible to save a plurality of pieces of already-outputted data, for example, when one piece of data is data for reproducing 20 ms sound, it may be possible to store three pieces of already-outputted data capable of reproducing 60 ms sound and re-output 60 ms sound of the three pieces of already-outputted data reproduced last. Alternatively, it may be possible to directly output the previously outputted already-outputted sound data to the sound output unit 13 without accumulating the already-outputted sound data in the accumulating unit 16. Then, the control unit 10 returns the process to step S201 and repeats the same process as described above.

In step S205, when a judgment is made that the re-output number exceeds the output number upper limit value (S205: YES), the control unit 10 stops the reproduction (output) of sound based on sound data (S212). Thereafter, the control unit 10 sets the saved accumulation upper limit saved value as an accumulation upper limit value (S213), initializes the re-output number counted by the output number counting unit 174 (S214), and terminates the output process. Note that after stopping the reproduction, when the accumulated amount of sound data accumulated in the accumulating unit 16 reaches again the initial accumulation value, the control unit 10 resumes the process from step S201.

Thus, in the data output apparatus 1 of the present invention, since sound reproduction is stopped when the re-output number exceeds the output number upper limit value, it is possible to reduce the feeling of incongruity during communication which is caused by repeated reproduction of the same sound. Moreover, by setting the accumulation upper limit saved value as an accumulation upper limit value in step S213, even when a state incapable of receiving data continues over a long time, it is possible to prevent the upper limit of the accumulated amount of data from becoming too high. It is therefore possible to prevent an increase in voice delay due to too high upper limit of the accumulated amount. Note that it may also be possible to decrease the accumulation upper limit value by only a predetermined value instead of setting the accumulation upper limit saved value as an accumulation upper limit value. Since the data output apparatus 1 of the present invention can reduce abnormality such as sound interruption due to running out of sound data to be outputted, it is possible to prevent a lowering of communication quality such as voice quality.

Figure 7:
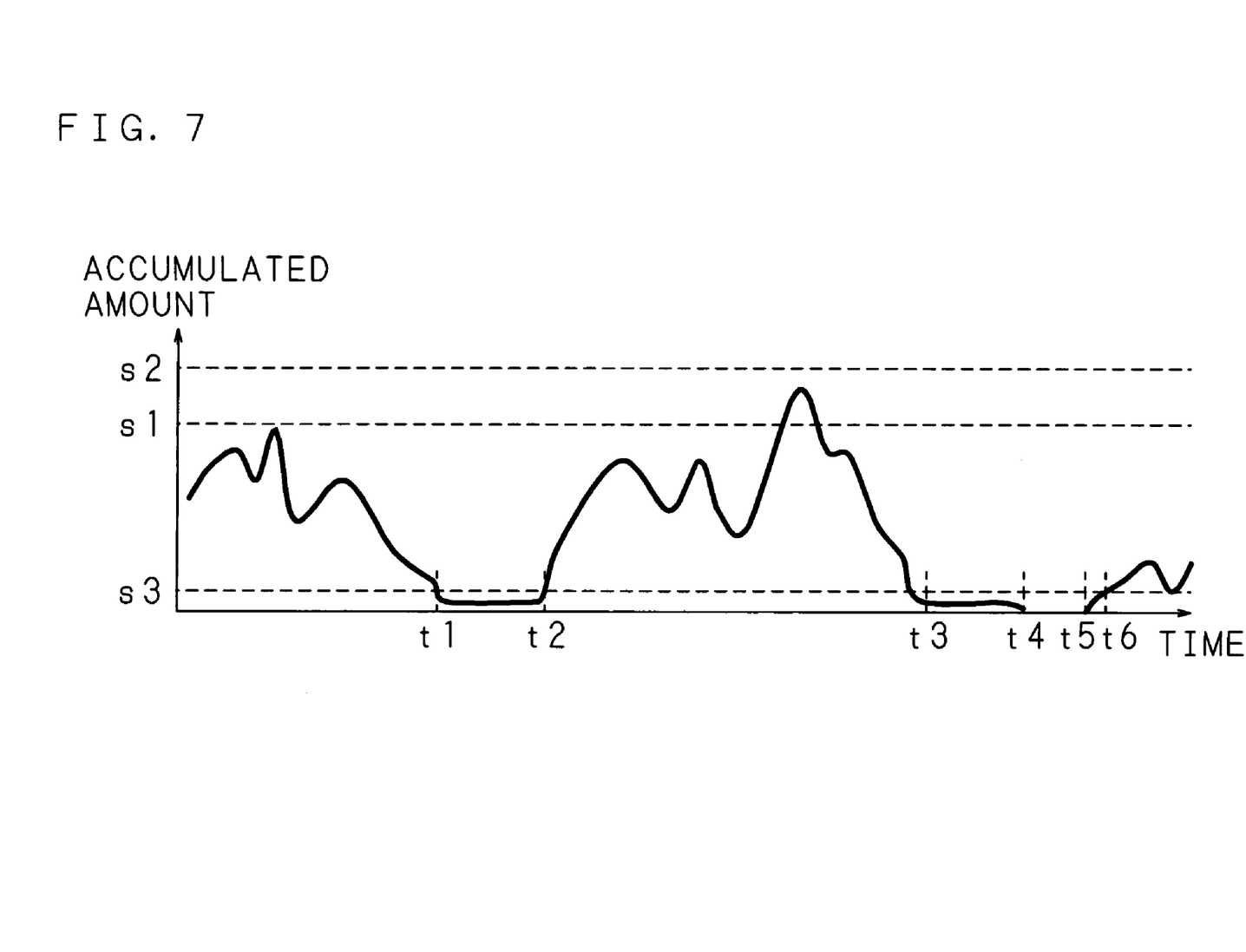
FIG. 7 is a graph showing a change with time in the accumulated amount of data that has not yet been outputted and has been accumulated in the data output apparatus of Embodiment 1 of the present invention.

Next, the following description will explain an example of the output state of the data output apparatus 1 of the communication system of Embodiment 1 of the present invention. FIG. 7 is a graph showing a change with time in the accumulated amount of data that has not yet been outputted and has been accumulated in the data output apparatus 1 of Embodiment 1 of the present invention. In FIG. 7, the axis of ordinates indicates the accumulated amount of data that has not yet been outputted and has been accumulated in the accumulating unit 16 of the data output apparatus 1, and the axis of abscissas indicates time.

Suppose that when the data output apparatus 1 reproduced sound based on sound data that has not yet been outputted and has been accumulated in the accumulating unit 16, it came into a state in which there was no accumulation of sound data that had not yet been outputted in the accumulating unit 16 at time t1. In this case, however, between time t1 and time t2, the data output apparatus 1 writes the sound data saved in the last data saving unit 173, namely the already-outputted sound data outputted previously, into the accumulating unit 16. Consequently, since the accumulating unit 16 is in a state in which the written already-outputted sound data has been accumulated, sound is reproduced based on the written already-outputted sound data. Then, at time t2, since a packet including sound data is received and the sound data starts to be accumulated in the accumulating unit 16, reproduction of sound based on the newly accumulated sound data that has not yet been outputted is started. Moreover, the setting of the accumulation upper limit value in the accumulating unit 16 is changed and increased from an accumulated amount s1 to an accumulated amount s2 in a period in which sound is outputted based on the already-outputted sound data outputted previously (between time t1 and t2).

Further, suppose that, at time t3, the data output apparatus 1 came into a state in which there was no accumulation of sound data that had not yet been outputted in the accumulating unit 16. In this case, between time t3 and time t4, the data output apparatus 1 writes the already-outputted sound data saved in the last data saving unit 173 into the accumulating unit 16. Consequently, since the accumulating unit 16 is in a state in which the written already-outputted sound data has been accumulated, sound is reproduced based on the written already-outputted sound data. However, at time t4, when the number of times the sound data saved in the last data saving unit 173 has been re-outputted exceeds the output number upper limit value, the data output apparatus 1 stops output of sound based on the sound data. Note that after stopping the reproduction, since a packet including sound data is received and the sound data starts to be accumulated in the accumulating unit 16 from time t5, the data output apparatus 1 can resume the reproduction of sound based on the sound data accumulated in the accumulating unit 16 from time t6 at which the accumulated amount of the sound data accumulated in the accumulating unit 16 reaches an initial accumulation value s3.

Without the functions of the data output apparatus 1 of Embodiment 1 of the present invention, sound interruption will occur at time t1 at which there is no accumulation of sound data that has not yet been outputted in the accumulating unit 16. Moreover, even when the accumulation of sound data is resumed at time t2, the reproduction of sound is not resumed until the accumulated amount of sound data reaches the initial accumulation value s3, and therefore the voice quality is lowered.

Embodiment 1 described above illustrates an example in which already-outputted data is consecutively saved, and the most recently outputted data is used as the already-outputted data outputted previously. However, the present invention is not limited to such a configuration, and may be developed into various forms, for example, already-outputted data may be saved at a predetermined interval such as 1 sec., instead of consecutively saving the data, and used as the already-outputted data outputted previously.

Embodiment 2

Figure 8:
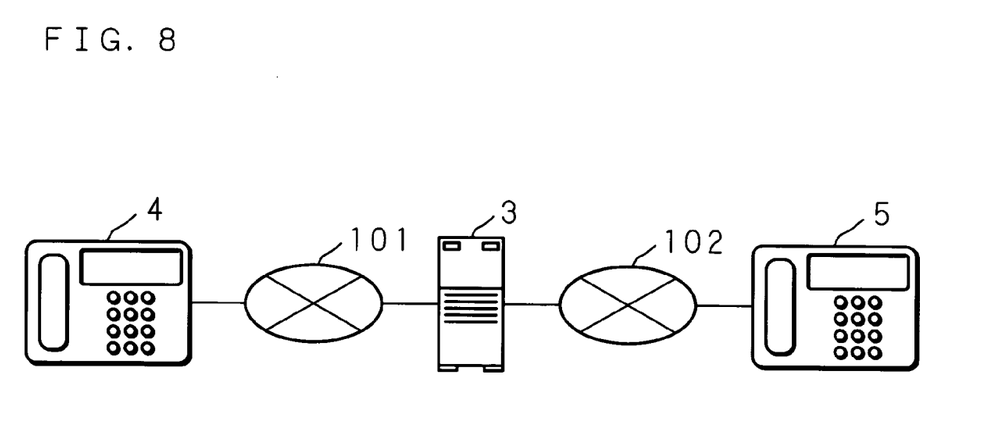
FIG. 8 is a schematic view showing an example of the conceptual configuration of a communication system of Embodiment 2 of the present invention.

FIG. 8 is a schematic view showing an example of the conceptual configuration of a communication system of Embodiment 2 of the present invention.

In FIG. 8, reference numeral 3 represents a data output apparatus of the present invention, and a computer for communication for use as a relay apparatus, such as an Internet router, is used. The data output apparatus 3 is connected to a first communication network 101 and a second communication network 102 such as VoIP network, and performs packet communication with a transmitting apparatus 4 such as an IP telephony terminal apparatus connected to the first communication network 101 and a receiving apparatus 5 such as an IP telephony terminal apparatus connected to the second communication network 102. The transmitting apparatus 4 generates packets including sound data for outputting the inputted sound, and transmits the generated packets to the data output apparatus 3 through the first communication network 101. The data output apparatus 3 transmits (outputs) the received packets to the receiving apparatus 5 through the second communication network 102. Then, the receiving apparatus 5 outputs sound based on the sound data included in the packets received from the data output apparatus 3. Note that although the transmitting apparatus 4 and the receiving apparatus 5 are described as different apparatuses for the sake of explanation, the configurations of these two apparatuses are substantially the same. Therefore, the data output apparatus 3 relays interactive communication rather than relaying one-way communication from the transmitting apparatus 4 to the receiving apparatus 5. Further, the first communication network 101 and the second communication network 102 may not be different communication networks, and may be the same communication network.

Figure 9:
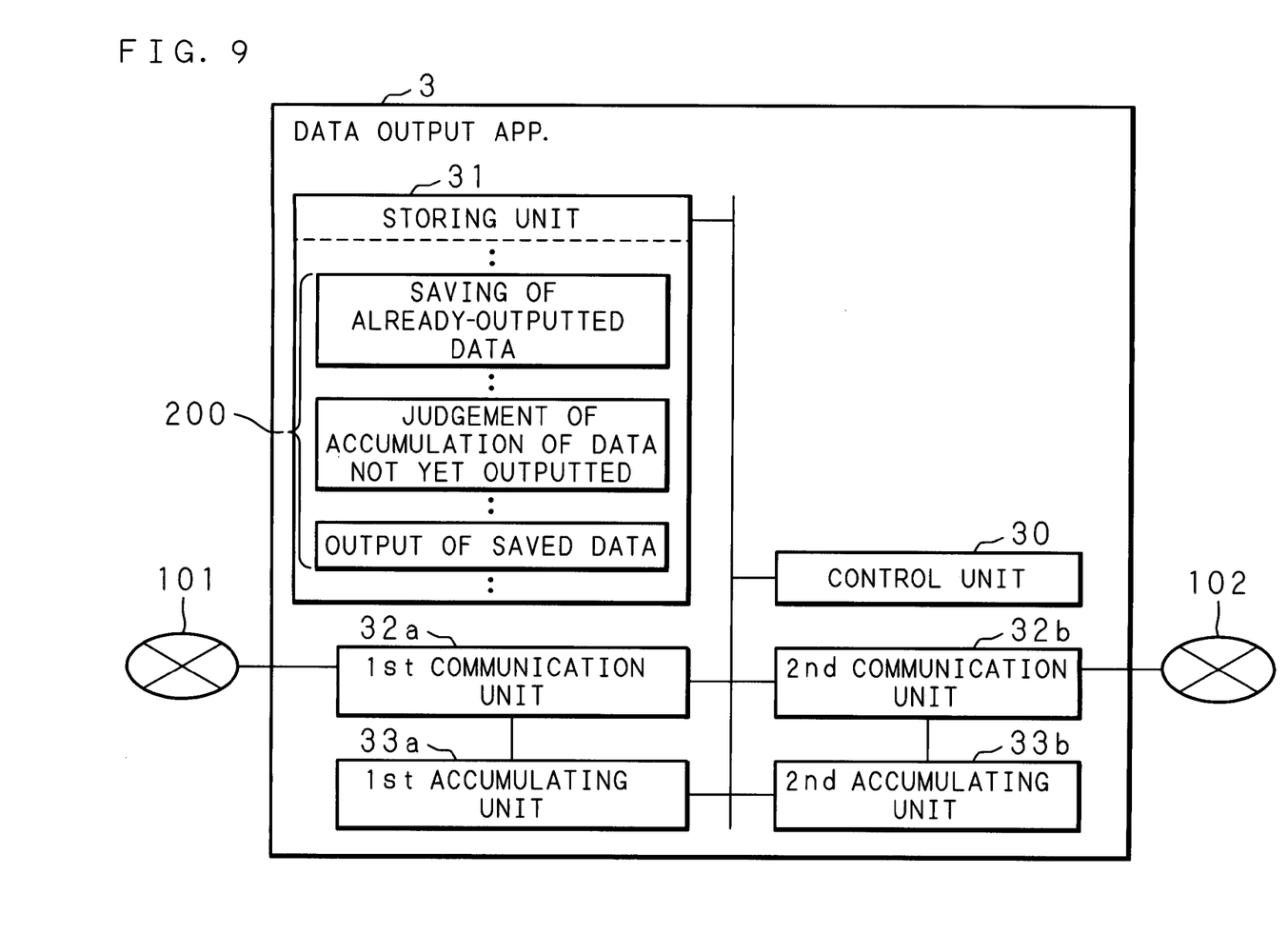
FIG. 9 is a block diagram showing an example of the internal configuration of a data output apparatus for use in the communication system of Embodiment 2 of the present invention.

FIG. 9 is a block diagram showing an example of the internal configuration of the data output apparatus 3 for use in the communication system of Embodiment 2 of the present invention.

The data output apparatus 3 comprises a control unit 30 such as a CPU for controlling the whole apparatus. Connected through a bus to the control unit 30 are various circuits including a storing unit 31 such as a flash memory and a RAM, a first communication unit 32a to be connected to the first communication network 101, a second communication unit 32b to be connected to the second communication network 102, a first accumulating unit 33a for use as a communication buffer for packets to be transmitted to the first communication network 101, and a second accumulating unit 33b for use as a communication buffer for packets to be transmitted to the second communication network 102. Further, in the storing unit 31 of the data output apparatus 3, a computer program 200 of the present invention is stored as firmware. Therefore, by reading the computer program 200 of the present invention stored in the storing unit 31 and executing it by the control unit 30, it is possible to cause the computer for communication to act as the data output apparatus 3 of the present invention.

Embodiment 2 of the present invention is a mode in which various processes performed by the data output apparatus 1 of Embodiment 1 are applied to a computer for communication, such as a relay apparatus, to cause the computer to function as the data output apparatus 3. Although the data output apparatus 1 of Embodiment 1 is configured to reproduce sound based on sound data included in the received packets as an output based on the packets, whereas the data output apparatus 3 of Embodiment 2 transmits the packets received from the transmitting apparatus 4 to the receiving apparatus 5 as an output based on the received packets.

The operation of the data output apparatus 3 of Embodiment 2 of the present invention is the same as the operation explained in Embodiment 1, and roughly the data output apparatus 3 is operated as follows. The first communication unit 32a receives sound data transmitted as packets from the transmitting apparatus 4 through the first communication network 101. The sound data thus received is stored in the second accumulating unit 33b, and transmitted (outputted) at a predetermined time interval to the receiving apparatus 5 from the second communication unit 32b through the second communication network 102. Note that the already-outputted sound data is saved in the same manner as in Embodiment 1. Moreover, when transmitting sound data as packets, the data output apparatus 3 of Embodiment 2 judges whether or not sound data that has not yet been transmitted has been accumulated in the second accumulating unit 33b, and when a judgment is made that there is no accumulation of sound data that has not yet been transmitted, the saved already-outputted sound data is transmitted as a packet. For the detail of the process, a reference should be made to the explanation described in Embodiment 1 since it is basically same as in Embodiment 1, and therefore the detailed explanation of Embodiment 2 will be omitted.

Embodiment 2 described above illustrates a configuration in which the computer for communication executes the processes as the data output apparatus of the present invention by executing the computer program of the present invention stored as firmware in the storing unit 31 of the data output apparatus 3. However, the present invention is not limited to such a configuration, and may be configured by mounting a hardware circuit for executing the functions of the data output apparatus of the present invention.

Although Embodiments 1 and 2 described above illustrate examples in which sound data is accumulated and outputted, the present invention is not limited to these examples, and may be applied to various types of streaming data such as image data as well as sound data.

Note that when streaming data such as sound data, image data, and the like to be received is a content representing only the difference from the previous data, when the previous data is saved and reproduced, the sound and/or image will not be interrupted, but an audience may have an impression that abnormal sound is included and/or the image is distorted. Therefore, for the streaming data for which the difference from the previous data is transmitted, it is preferred to save the sound reproduced last and/or the entire image data and perform reproduction based on the data, or perform the process of reproducing the differential data indicating that no change has been made. More specifically, when the target data is image data and only the difference from the previous frame is transmitted as data, when only the previous frame is saved and reproduction is performed, there is a possibility that the image may rather be displayed in an abnormal condition. Therefore, the data about the entire image displayed last is saved, and reproduction of the image is repeated for a predetermined time or a predetermined number of frames based on the saved data of the entire image, or reproduction of frame data indicating that there is no difference from the previous frame is repeated for a predetermined time or a predetermined number of frames. Consequently, the image that does not give an audience the feeling of incongruity can be reproduced based on the saved data.

Moreover, in the case where the target data is sound data and only the difference from the previous sound data is transmitted as data, sound that does not give an audience the feeling of incongruity can be reproduced based on the saved sound data by executing processes similar to those performed for the image data.

As described above, since the present invention is applied to apparatuses such as, for example, an apparatus at the receiving end and a relay apparatus involved in packet communication of an IP telephony system and can reduce occurrence of abnormality such as sound interruption due to running out of data to be outputted, it is possible to prevent a lowering of communication quality such as voice quality. Moreover, since the present invention can reduce occurrence of abnormality irrespective of the accumulation capacity of the accumulating unit for accumulating data, when it is applied to an apparatus that automatically optimizes the accumulation capacity of the accumulating unit, it is possible to prevent a lowering of communication quality even before the accumulation capacity is optimized.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data output method for accumulating received data in an accumulating unit and performing output based on the data accumulated in said accumulating unit, comprising:

saving already-outputted data;

judging, when performing output based on data, whether or not data that has not yet been outputted has been accumulated in said accumulating unit;

performing re-output for at least a part of said saved already-outputted data when there is no accumulation of data that has not yet been outputted, wherein an upper limit value is set on an accumulated amount of data in said accumulating unit;

accumulating already-outputted data in said accumulating unit when a judgment is made that there is no accumulation of data that has not yet been outputted; and increasing a set value of said upper limit value according to an amount of already-outputted data accumulated in said accumulating unit.

2. A data output apparatus including an accumulating unit for accumulating received data, for performing output based on the data accumulated in said accumulating unit, comprising:

a data saving unit for saving already-outputted data; and a judging unit for, when performing output based on data, judging whether or not data that has not yet been outputted has been accumulated in said accumulating unit, wherein when said judging unit judges that there is no accumulation of data that has not yet been outputted, re-output is performed for at least a part of the already-outputted data saved in said data saving unit, an upper limit value of an accumulated amount of data is set for said accumulating unit, said accumulating unit accumulates the already-outputted data saved in said data saving unit, when said judging unit judges that there is no accumulation of data that has not yet been outputted, and a set value of said upper limit value of accumulated amount of data in said accumulating unit is increased according to an amount of already-outputted data accumulated in said accumulating unit.

3. The data output apparatus as set forth in claim 2, wherein the set value of said upper limit value of accumulated amount of data in said accumulating unit is increased, when output is performed base on the already-outputted data.

4. The data output apparatus as set forth in claim 2, wherein an upper limit value is set on the number of times of output based on the already-outputted data, and said data output apparatus further comprises:

a counting unit for counting the number of times of output based on the already-outputted data; and a restricting unit for restricting output based on the already-outputted data, based on the number of times of output counted by said counting unit and said upper limit value of the number of times of output.

5. The data output apparatus as set forth in claim 4, wherein as an upper limit value of an accumulated amount of data in said accumulating unit, a value before starting output based on the already-outputted data is saved as a saved value, and when said restricting unit restricts output based on the already-outputted data, said saved value is set as said upper limit value of said accumulated amount of data in said accumulating unit.

6. A communication system including:

a transmitting apparatus for transmitting data; and a data output apparatus which comprises an accumulating unit for accumulating received data in communication with said transmitting apparatus, and performs output based on data accumulated in said accumulating unit, and further comprises: a data saving unit for saving already-outputted data; and a judging unit for, when performing output based on data, judging whether or not data that has not yet been outputted has been accumulated in said accumulating unit; and performs re-output for at least a part of said already-outputted data saved in said data saving unit, when said judging unit judges that there is no accumulation of data that has not yet been outputted, wherein an upper limit value of an accumulated amount of data is set for said accumulating unit of said data output apparatus, said accumulating unit of said data output apparatus accumulates the already-outputted data saved in said data saving unit of said data output apparatus, when said judging unit of said data output apparatus judges that there is no accumulation of data that has not yet been outputted, and a set value of said upper limit value of accumulated amount of data in said accumulating unit of said data output apparatus is increased according to an amount of already-outputted data accumulated in said accumulating unit of said data output apparatus.

7. The communication system as set forth in claim 6, wherein the set value of said upper limit value of accumulated amount of data in said accumulating unit of said data output apparatus is increased, when output is performed base on the already-outputted data in said data output apparatus.

8. The communication system as set forth in claim 6, wherein an upper limit value is set on the number of times of output based on the already-outputted data in said data output apparatus, and said data output apparatus further comprises:

a counting unit for counting the number of times of output based on the already-outputted data; and a restricting unit for restricting output based on the already-outputted data, based on the number of times of output counted by said counting unit and said upper limit value of the number of times of output.

9. The communication system as set forth in claim 8, wherein as an upper limit value of an accumulated amount of data in said accumulating unit of said data output apparatus, a value before starting output based on the already-outputted data is saved as a saved value in said data output apparatus, and when said restricting unit of said data output apparatus restricts output based on the already-outputted data, said saved value is set as said upper limit value of said accumulated amount of data in said accumulating unit of said data output apparatus.

10. The communication system as set forth in claim 9, wherein said received data is sound data, and output of said data output apparatus is reproduced sound based on said sound data.

11. The communication system as set forth in claim 9, further including a receiving apparatus for receiving data, wherein said data output apparatus outputs and transmits data received from said transmitting apparatus to said receiving apparatus.

12. The communication system as set forth in claim 11, wherein said received data is sound data, and said receiving apparatus reproduces sound base on the sound data received from said data output apparatus.

13. A computer program product embodied in a computer-readable medium for controlling output based on data accumulated in an accumulating unit for accumulating data received from outside, wherein said computer program product comprises computer readable program code that causes a computer to perform:

saving already-outputted data;

judging, when performing output based on data, whether or not data that has not yet been outputted has been accumulated in said accumulating unit;

performing re-output for at least a part of said saved already-outputted data when a judgment is made that there is no accumulation of data that has not yet been outputted, wherein an upper limit value is set on an accumulated amount of data in said accumulating unit;

accumulating already-outputted data in said accumulating unit when a judgment is made that there is no accumulation of data that has not yet been outputted; and increasing a set value of said upper limit value according to an amount of already-outputted data accumulated in said accumulating unit.

* * * * *